United States Patent
Engelberth et al.

(10) Patent No.: US 7,215,860 B2
(45) Date of Patent: May 8, 2007

(54) OPTICAL TRANSMISSION FIBER WITH A GLASS GUIDING CLADDING

(75) Inventors: Jon W. Engelberth, Denville, NJ (US); Douglas P. Holcomb, Morris Plains, NJ (US); Paul F. Wysocki, Flemington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 3 days.

(21) Appl. No.: 11/120,212

(22) Filed: May 2, 2005

(65) Prior Publication Data

US 2006/0245707 A1    Nov. 2, 2006

(51) Int. Cl.
*G02B 6/036* (2006.01)
*G02B 6/26* (2006.01)

(52) U.S. Cl. .................. 385/127; 385/50; 385/128; 385/140; 385/32

(58) Field of Classification Search .............. None
See application file for complete search history.

(56) References Cited

U.S. PATENT DOCUMENTS

| | | | |
|---|---|---|---|
| 4,877,306 A | 10/1989 | Kar | |
| 5,141,549 A | 8/1992 | Tumminelli | |
| 5,262,365 A | 11/1993 | Oyobe et al. | |
| 5,422,897 A | 6/1995 | Wyatt et al. | |
| 5,572,618 A | 11/1996 | DiGiovanni et al. | |
| 5,633,964 A | 5/1997 | DiGiovanni et al. | |
| 5,822,489 A | 10/1998 | Hale | |
| 5,841,926 A * | 11/1998 | Takeuchi et al. ............ 385/123 |
| 6,198,868 B1 | 3/2001 | Jang | |
| 6,356,699 B1 | 3/2002 | Bartholomew et al. | |
| 6,424,775 B1 | 7/2002 | Paillot et al. | |
| 6,429,162 B1 | 8/2002 | Prassas | |
| 6,463,201 B2 | 10/2002 | Aiso et al. | |
| 6,477,295 B1 * | 11/2002 | Lang et al. ................... 385/31 |
| 6,487,340 B2 * | 11/2002 | Enomoto et al. ............. 385/37 |
| 6,498,888 B1 | 12/2002 | Chenard et al. | |
| 6,512,879 B1 | 1/2003 | Beguin et al. | |
| 6,732,549 B1 | 5/2004 | Lum et al. | |
| 2004/0175086 A1 | 9/2004 | Reith et al. | |

FOREIGN PATENT DOCUMENTS

JP    56101108 A  *  8/1981

OTHER PUBLICATIONS

Ra'ed Al-Zu'bi, "Optical Fiber Fabrication & Measurements", Fiber Fabrication, pp. 1-32. No date.
Emmanuel Desurvire, "Erbium Doped Fiber Amplifiers: Principles and Applications"; John Wiley & Sons Inc. (1994), Chapter 4, Figure 4.1, p. 210. No mention.

* cited by examiner

*Primary Examiner*—John D. Lee
*Assistant Examiner*—Omar Rojas

(57) ABSTRACT

The present invention provides an apparatus comprising a passive optical transmission fiber. The passive optical transmission fiber comprises a passive glass fiber core, a glass optical inner cladding surrounding the core and a glass optical outer cladding surrounding the inner cladding. The inner cladding has a lower index of refraction than the passive glass fiber core and the outer cladding has a lower index of refraction than the inner cladding. The passive optical transmission fiber also comprises a second optical segment coupled to the optical fiber. The second optical segment is configured to dissipate light in the inner cladding.

19 Claims, 4 Drawing Sheets

OPTICAL TRANSMISSION FIBER WITH A GLASS GUIDING CLADDING

This invention was made with U.S. Government support. The U.S. Government has certain rights to this invention.

TECHNICAL FIELD

The present invention is directed, in general, to transmission fiber optics, and more specifically, to an apparatus and system comprising a glass optical fiber.

BACKGROUND

A common problem where light is coupled into an optical fiber is that there is a loss of light. For instance, even with careful design to match the input numerical aperture to that of the fiber, there is usually a lateral or angular misalignment with respect to the downstream fiber. This misalignment can result in light being coupled into the cladding rather than into the core, as intended. Light escaping from the core is commonly referred to as cladding mode light, or simply cladding light.

Cladding light can be present in a variety of devices: a laser diode, a splice, in a free space optical device, or a tapered fiber device. Cladding light can also appear in intentionally bent fiber, in periodical structures, such as fiber gratings, or at inadvertent micro-bends in a fiber. It is desirable to remove the cladding light before the next discontinuity in the fiber path for a number of reasons, among them because the cladding light can couple back into the fiber's core, generating multi-path interference.

The removal of cladding light, however, can cause unacceptable heating within an apparatus containing or coupled to the optical fiber. In particular, heating caused by the dissipation of cladding light can be very detrimental to the operation of high optical throughput apparatus. This problem is becoming increasingly important as the industry trends toward high power applications. As the amount of power carried in optical fiber increases from levels of a few watts up to kilowatts, conventional approaches to remove cladding light become inadequate.

For example, the removal of cladding light into polymeric coatings can be problematic in high power applications where the amount of cladding light is greatly increased. The removal of such light can cause excessive heating of the polymer coating as it absorbs the light, causing accelerated aging, and sometimes failure, of the coating and then the fiber. Additionally, in situations where the use of a polymer coating is unacceptable, there can be insufficient space in a device package to couple adequate numbers of heat sinks to the optical fiber to dissipate heat.

The present invention overcomes these problems by providing a light guiding structure in a glass cladding that facilitates the controlled dissipation of heat associated with the removal of cladding light from an optical fiber.

SUMMARY OF THE INVENTION

To address the above-discussed deficiencies, one embodiment provides an apparatus comprising a passive optical transmission fiber. The passive optical transmission fiber comprises a passive glass fiber core, a glass optical inner cladding surrounding the core and a glass optical outer cladding surrounding the inner cladding. The inner cladding has a lower index of refraction than the passive glass fiber core and the outer cladding has a lower index of refraction than the inner cladding. The passive optical transmission fiber also comprises a second optical segment configured to dissipate light in the inner cladding Another embodiment is a system comprising a device connected to the above-described passive optical transmission fiber.

BRIEF DESCRIPTION OF THE DRAWINGS

The embodiments are best understood from the following detailed description, when read with the accompanying FIGUREs. Various features may not be drawn to scale and may be arbitrarily increased or reduced for clarity of discussion. Reference is now made to the following descriptions taken in conjunction with the accompanying drawings, in which.

DETAILED DESCRIPTION

The present invention recognizes the advantageous use of a light-guiding structure located in a glass cladding of a passive optical transmission fiber to control the dissipation of heat associated with cladding light. The light-guiding structure is made by adjusting the refractive index of an outer glass cladding to be less than the refractive index of an inner glass cladding. The outer glass cladding advantageously guides the cladding light to locations along the passive optical transmission fiber where it is desirable to remove it. The light guiding structures of the present invention advantageously offer a large variety and combination of heat dissipation mechanisms in transmission fiber optics.

Figure 1:
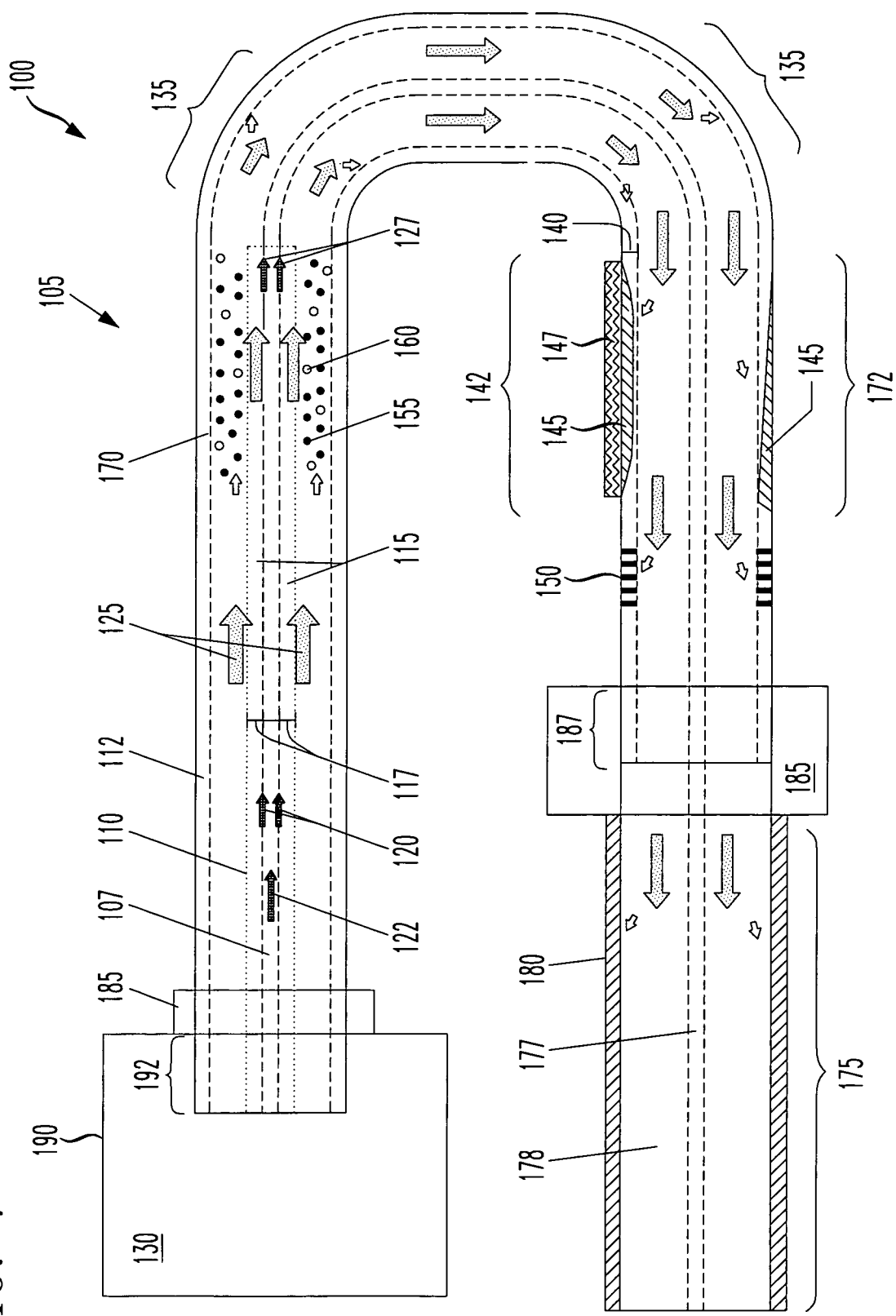
FIG. 1 illustrates a sectional view of an exemplary apparatus.

FIG. 1 illustrates a sectional view of an exemplary apparatus 100. The apparatus 100 comprises a passive optical transmission fiber 105 in a high power application. The term passive optical fiber as used herein has a core 107 substantially free of any rare earth elements and therefore the fiber 105 cannot work as a rare earth amplifier fiber. This is in contrast to an active optical fiber, such as a fiber amplifier, that requires energy, in the form of an external source of shorter wavelength light, to optically pump the core to amplify a signal transmitted through the optical fiber.

The passive optical transmission fiber 105 comprises a passive glass fiber core 107, a glass optical inner cladding 110 surrounding the core 107 and a glass optical outer cladding 112 surrounding the inner cladding 110. The inner cladding 110 has a lower index of refraction than the passive glass fiber core 107 and the outer cladding 112 has a lower index of refraction than the inner cladding 110.

In preferred embodiments of the fiber 105, the inner cladding 110 has a radial zone 115 adjacent to and surrounding the core 107. A refractive index of the radial zone 115 varies by less than 0.001 and has a radial thickness 117 of at least about 5 microns. A radial zone 115 having such a uniform refractive index advantageously minimizes changes to the tails 120 of a signal 122 that extends into the inner cladding 110. In some cases the radial zone 115 of the inner cladding 110 extends through the entire length of the fiber 105 (e.g., the long dimension of the fiber 105 that the signal 122 travels down). In other cases, however, only a portion of the inner cladding 110 has the radial zone 115.

In some preferred embodiments the refractive index of the radial zone 115 varies by less than 0.0001. In other preferred embodiments the radial thickness 117 of the radial zone 115 at least about 10 microns. In still other instances the entire inner cladding 110 varies by less than 0.001.

The passive glass fiber core 107 is made of any transparent glass material, including silica ($SiO_2$) glass such as quartz, halide glass fibers such as fluoride glass, or other glass materials well know to those skilled in the art. The core 107 can be configured as a single-mode or multi-mode fiber. In some instance, it is desirable to dope the passive glass fiber core 107 to adjust its refractive index. Those skilled in the art would be familiar with the types and concentration of dopants to adjust the refractive index. For example, the core 107 can comprise germanium (e.g., $GeO_2$), phosphorus (e.g., $P_2O_5$) or aluminum, to increase its refractive index, or boron (e.g., $B_2O_3$) to decrease its refractive index. In other embodiments, the core 107 is undoped silica glass.

For the passive optical transmission fiber 105 to function at high power, the passive glass fiber core 107 must be substantially free of any species that would change the signal 122 being transmitted down the core 107. In particular, the core 107 is substantially free of any species that would change the frequency spectrum of core mode signals. Also, the concentration of any light absorbing species in the core 107 must be less than an amount that would cause substantial loss of the signal 122 per unit length of core 107. Preferably, the core 107 loses less than about 0.5 and more preferably, less than about 0.2 dB per meter of the signal 122 passing along the core's length.

Conventional active glass fiber cores or passive attenuating glass cores are therefore inappropriate for use in the present invention. In particular, a core having the types and concentrations of light absorbing species found in passive attenuating glass cores and in active glass fiber cores is contraindicated. Passive attenuating glass core are used in optical attenuators, where high concentrations of certain transition metal elements (Groups 3–12 in the Periodic Table of Elements), such as cobalt, are added to the core to specifically to absorb light. As noted above, active glass fiber cores are used in active devices such as fiber amplifiers. Active glass fiber cores contain high concentrations of certain rare-earth elements (Atomic Numbers 57–71 in the Periodic Table of Elements), such as erbium, that allow the fiber to amplify, attenuate, or phase retard light being passed through it. Transition metal and rare-earth elements, in the absence of optical pumping, would absorb light, and therefore could detrimentally attenuate the optical power of the signal 122 in the passive core 107.

As noted above, the inner and outer claddings 110, 112 are made of glass and surround the core 107. Preferably, the inner and outer claddings 110, 112 concentrically surround the core, although non-concentric arrangements are also within the scope of the present invention. The claddings 110, 112 are made of glass because glass advantageously minimizes the absorption of light being passed through the passive optical transmission fiber 105. This is particularly desirable in applications where the objective is to carry cladding light 125 and heat associated with its dissipation, well outside of a device package 130 of the apparatus 100.

The inner and outer claddings 110, 112 can be made of the same or different type of glass as used in the passive glass core 107. Similarly, the inner and outer claddings 110, 112 can have the same or different types of dopants as described above for the core 107. Of course, the dopant type and concentration in the inner and outer claddings 110, 112, are selected to provide the appropriate refractive indexes such as discussed above.

In some cases the inner glass cladding 110 is undoped quartz and the outer glass cladding 112 is quartz doped with fluorine. In other cases the inner glass cladding 110 is doped with germanium, and the outer glass cladding 112 is undoped or fluorine-doped quartz. In still other embodiments, both of the inner and outer claddings 110, 112 comprise silica-glass doped with fluorine. In such cases, the outer glass cladding 112 preferably has a higher concentration of fluorine than the fluorine concentration in the inner glass cladding 110.

The inner and outer glass claddings 110, 112 can be characterized in terms of a numerical aperture (NA). As well known to those skilled in the art, NA generally refers to that ability of an optical fiber to capture light, or the acceptance cone of the optical fiber. Here, NA refers to the ability of the inner glass cladding 110 to capture the cladding light 125.

The NA of the inner glass cladding 110 is carefully selected to balance several factors. Preferably the inner glass cladding 110 has a NA ranging from about 0.05 to about 0.25. An NA of less than 0.05 is undesirable because excess light can be lost though the outer glass cladding 112, resulting in heating. In other embodiments, a NA ranging from about 0.05 to about 0.10 is desirable. Such is the case where, through the careful adjustment of NA, light can be removed from the inner cladding 110 by bending the passive optical transmission fiber 105 without disturbing the light passing through the core 107.

The NA, however, should be high enough to allow the outer glass cladding 112 to serve as a guide for the cladding light 125. In some cases, an NA from about 0.20 to about 0.25 is preferred because this range of NA is conducive to allowing sharper bends in the passive optical transmission fiber 105 without light being lost at the bend. Too high an NA, however, can also be detrimental in some applications. For instance, the use of high concentrations of certain dopants, such as fluorine, in one or both of the inner or outer claddings 110, 112 to increase NA can also detrimentally reduce the melting point of the doped glass. A lowered melting point, in turn, can make the fabrication of passive optical transmission fibers by conventional fiber drawing processes more problematic. This can increase manufacturing costs or decrease the quality of the passive optical transmission fiber produced.

The NA of the inner cladding 110 is a function of the refractive indexes of the inner and outer claddings 110, 112. This functional relationship is expressed quantitatively by the well-known equation: $NA=\sqrt{(2n_{inner} \cdot \Delta n)}$, where $n_{inner}$ is the inner cladding's refractive index, and $\Delta n = n_{inner} - n_{outer}$, the un-normalized difference between the inner cladding's refractive index and $n_{outer}$, the outer cladding's refractive index.

The larger the difference between $n_{inner}$ and $n_{outer}$, the larger the NA. As an example, when $n_{inner}$ equals about 1.44 and $n_{outer}$ equals about 1.439, an about 0.06 percent difference, then NA equals about 0.05. However, when $n_{inner}$ equals about 1.44 and $n_{outer}$ equals about 1.418, an about 1.5 percent difference, then NA equals about 0.25. The refractive index of the inner or outer claddings, 110, 112, or both, can be adjusted to obtain the desired NA for the inner cladding 110, by doping the claddings 110, 112 with dopants as discussed above. As an example, a silica glass outer cladding 112 that is heavily doped with fluorine and an undoped silica glass inner cladding 110 can provide an inner glass cladding 110 have an NA of about 0.22.

Figure 2A:
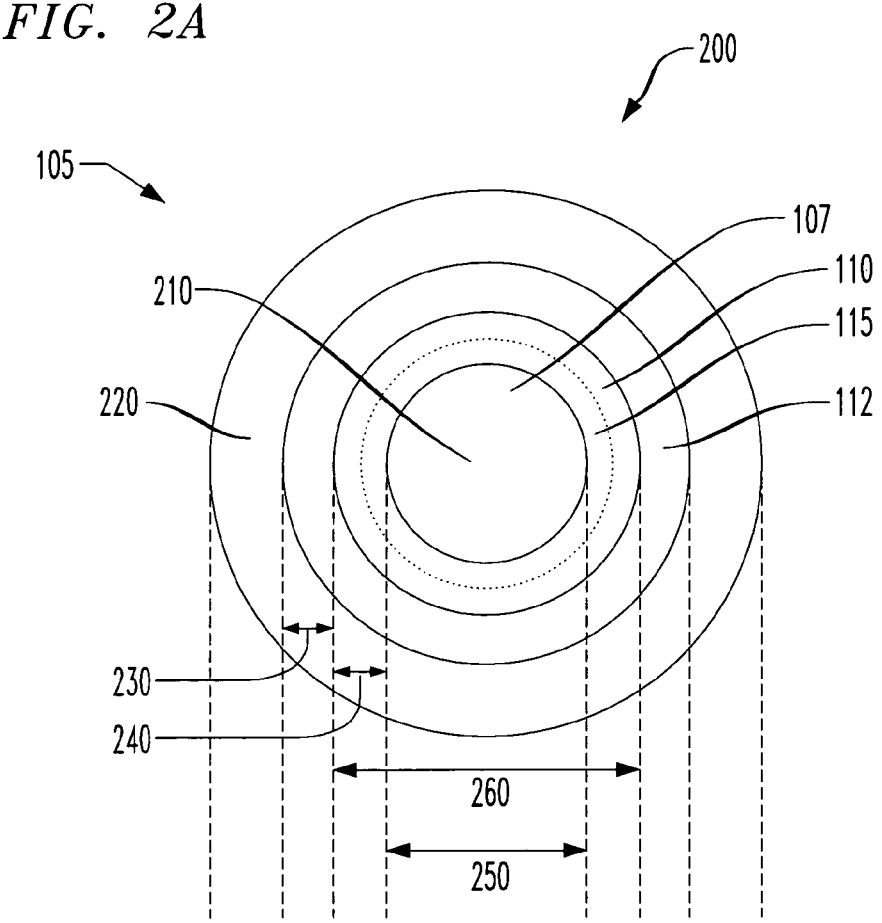
FIG. 2 illustrates: A) a cross-sectional view of one embodiment of a passive optical transmission fiber of an exemplary apparatus, and B) an exemplary refractive index profile corresponding to the optical fiber shown in FIG. 2A.

With continuing reference to FIG. 1, additional aspects of the present invention are illustrated in FIG. 2A, which presents a cross-sectional view of one embodiment of a passive optical transmission fiber 105 of an apparatus 200. Elements of the apparatus 200 that are analogous to the apparatus shown in FIG. 1 are assigned the same reference numbers. Any of the dimensions and properties of the passive optical transmission fiber discussed above in the context of FIG. 1 are applicable to this embodiment.

Figure 2B:
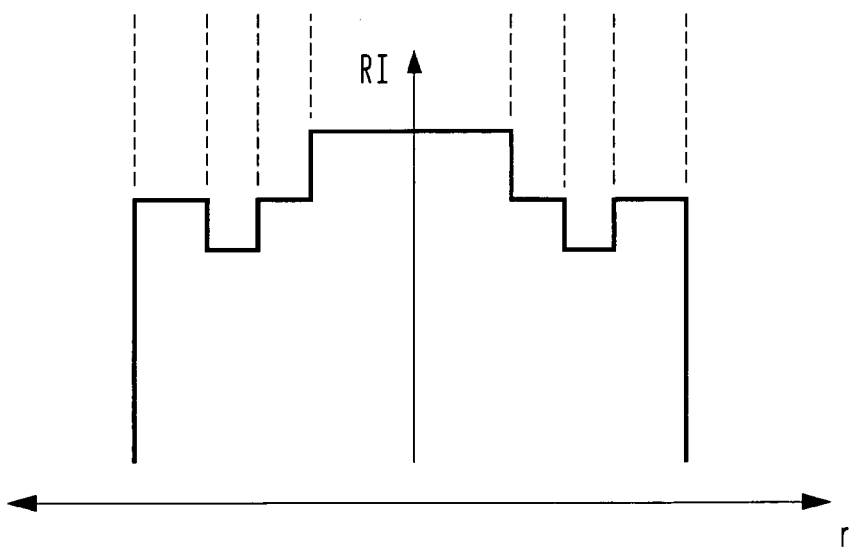

The exemplary passive optical transmission fiber 105 shown in FIG. 2A comprises a passive glass fiber core 107, inner glass cladding 110 and outer glass cladding 112, analogous to that described for the passive optical transmission fiber shown in FIG. 1. FIG. 2B presents an exemplary relative refractive index (RI) profile of the core 107 and claddings 110, 112 as a function of the radial distance (r) from the center 210 of the passive optical transmission fiber 105. The refractive index profiles are depicted as single step functions, such as used in a single-mode fiber. However, one skilled in the art would appreciate any type of conventional profile, such as a graded profile, could also be used.

As illustrated in FIGS. 2A and 2B the outer glass cladding 112 comprises a ring of low refractive index glass between the inner glass cladding 110 and a third glass cladding 220 of higher index glass. The outer glass cladding 112 preferably has a radial thickness 230 that is large enough to ensure that the cladding light 125 (shown in FIG. 1) does not pass through the outer cladding 112. As well known to those skilled in the art, the radial thickness 230 used will depend upon the magnitude of $\Delta n$. In some preferred embodiments, for example, the radial thickness 230 ranges from about 3 to about 10 microns.

With continuing reference to FIG. 2A, the inner cladding 110 has a radial thickness 240 that is big enough, at least about 5 microns, to carry the cladding light 125 (FIG. 1) that escapes from the core 107. In some embodiments, however, it is preferable to increase the radial thickness 240 of the inner cladding. A larger radial thickness 240 is preferred when the inner cladding 110 is configured to carry large quantities of cladding light 125. This can arise when a high-powered transmission signal is being passed into the core 107, or when a substantial proportion of the transmission signal is lost from the core 107 into the inner cladding 110. Preferably, in such applications, a diameter 250 of the inner cladding 110 is as large as possible while allowing sufficient thickness for the outer cladding 112. In some embodiments, a diameter 250 of the inner cladding 110 is preferably about 5 to about 12 times a diameter 260 of the core 107. As one example, when the core's diameter 260 is about 9 microns, the inner cladding's diameter 250 is about 45 microns to about 108 microns. Consequently, the inner cladding's radial thickness 240 ranges from about 18 to about 50 microns.

The third glass cladding 220, as illustrated in FIG. 2B, can have a refractive index that is substantially the same as, and in some cases identical to, the refractive index of the inner cladding 110. The third cladding 220 can have a refractive index that is greater than the inner cladding 110. The third cladding 220 advantageously increases the mechanical strength of the passive optical transmission fiber 105 and protects the core 107, inner cladding 110 and outer cladding 112 from mechanical damage. When the refractive index of the third cladding 220 is lower than refractive index of the outer cladding 112, the third cladding 220 acts as an additional light guide to prevent cladding light 125 from passing out of the outer cladding 240.

Figure 3A:
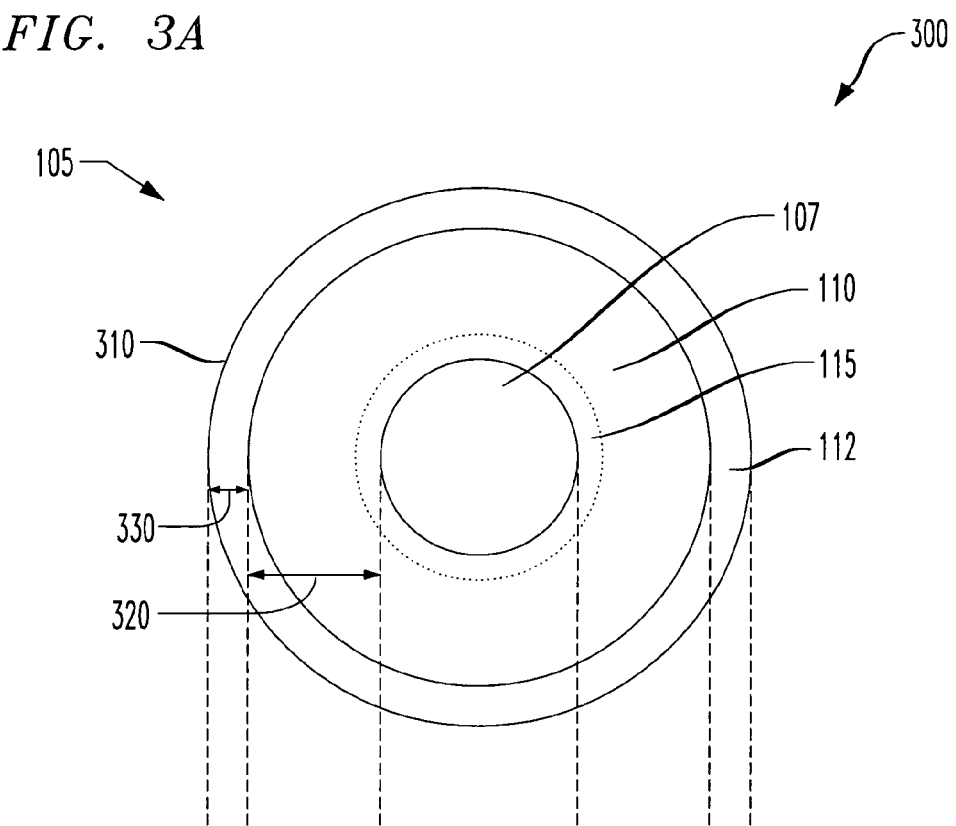
FIG. 3 illustrates: A) a cross-sectional view of a second embodiment of a passive optical transmission fiber of an exemplary apparatus, and B) an exemplary index profile corresponding to the optical fiber shown in FIG. 3A.
Figure 3B:
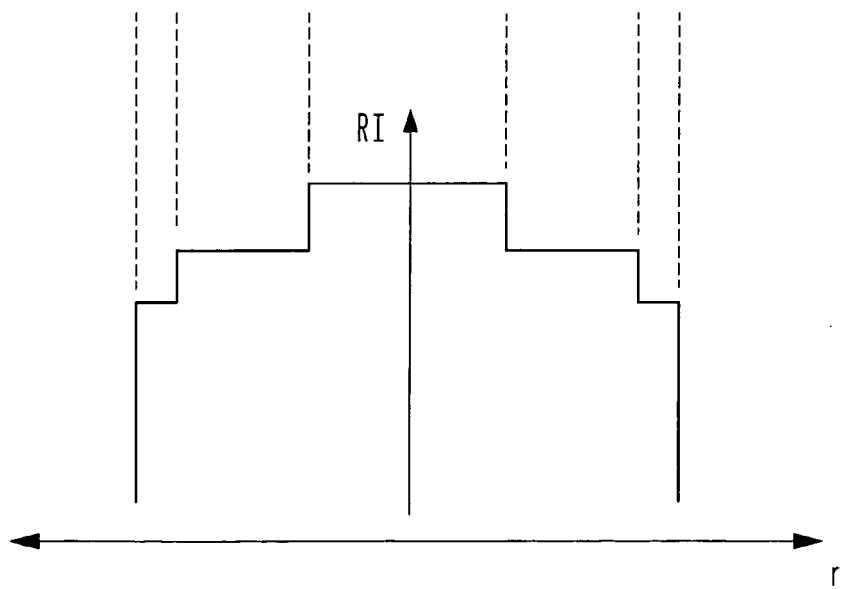

In still other embodiments, however, there is no third cladding 220. This is illustrated in FIG. 3A, which presents a cross-sectional view of an exemplary passive optical transmission fiber 105 of an apparatus 300 in which there is no third glass cladding. As with FIGS. 2A and 2B, elements of the apparatus 300 that are analogous to the apparatus shown in FIG. 1 are assigned the same reference numbers, and an exemplary refractive index profile is presented in FIG. 3B. As illustrated in FIGS. 3A and 3B, the outer glass cladding 112 comprises a ring of low refractive index glass coincident with an outer perimeter 310 of the passive optical transmission fiber 105. Such embodiments have the advantage of maximizing a radial thickness 320 of inner cladding 110 for the capture of large quantities of cladding light 125.

Of course, the radial thickness 330 of the outer cladding 112 is still sufficient to serve as a guide for the cladding light 125 in the inner cladding 110. Another advantage of this embodiment is ease and cost of manufacturing. For instance, it is easier to manufacture the inner cladding 110 of FIG. 3A than the inner cladding 110 of FIG. 2A without detrimentally affecting the refractive index of the core 107.

Once the cladding light 125 has been guided away from a location where heating is undesirable, the cladding light 125 can be removed from the passive optical transmission fiber 105. Several examples of how the inner and outer claddings 110, 112 can be re-configured to facilitate removal of the cladding light 125 are illustrated in FIG. 1 and discussed below. Although discussed individually, one skilled in the art would appreciate that any or all of the cladding configurations discussed below could be combined as needed to tailor the removal of cladding light 125 for a particular application and apparatus 100.

The passive optical transmission fiber 105 also comprises a second optical segment configured to dissipate light 125 in the inner cladding 110. FIG. 1 illustrates several different second optical segment configurations to facilitate the removal of the cladding light 125 of the passive optical transmission fiber 105. In some cases, the second optical segment is a bend 135 in the passive optical transmission fiber 105. The bend 135 encourages the cladding light 125 to exit the outer cladding 112 in the vicinity of the bend 135 where it can be dissipated as heat into the ambient environment, or various heat absorbing structures as further discussed below.

In other cases, the second optical segment comprises a reduced radial thickness 140 of the outer glass cladding 112 at one or more discrete location 142. Preferably, the outer glass cladding's 112 radial thickness 140 is less than about 5 microns, or removed entirely, to facilitate removal of the cladding light 125. In other instances, the second optical segment comprises an index-matching material 145 placed at the discrete location 142 where the outer glass cladding 112 is reduced or removed. The index-matching material 145 absorbs or transmits the cladding light 125 and dissipates it as heat or light to the ambient environment or to a conventional heat sink 147.

Suitable index-matching materials 145 comprise glass, adhesives, gels or an organic polymer coating. When the outer glass cladding 112 is removed, or in some cases entirely removed, the index-matching material 145 preferably has a refractive index that is substantially the same as (e.g., within about 1 percent of the inner glass cladding 110), or in some cases greater than, the refractive index of the inner glass cladding 110. Alternatively, when the outer glass cladding 112 is retained, the index-matching material 145 preferably has a refractive index that is substantially the same, or in some cases, greater than the refractive index of the outer glass cladding 112.

In some embodiments, the second optical segment comprises a grating 150 in the outer glass cladding 112. The grating 150 can comprise any conventional pattern of periodic perturbations in the refractive index of the inner glass cladding 110 that configures the grating 150 to absorb and couple cladding light 125 out of the optical fiber 105. Of course, the periodicity of the grating 150 can be configured to absorb either single or multiple wavelengths of cladding light 125.

In some situations, such as high power applications, removing the cladding light 125 at discrete locations is undesirable because excessive local heating will occur at the removal points. To facilitate a gradual removal of cladding light 125, the second optical segment can comprise absorbing species 155 in one or both of the inner glass cladding 110, the outer glass cladding 112. The absorbing species 155 are configured to absorb transmission wavelengths of the cladding light 125 passing through the inner glass cladding 110. Absorbing species 155, such as iron, nickel, cobalt, chromium, copper, manganese, titanium, vanadium, or mixtures thereof, can be selected for their ability to absorb light over a broad wavelength (e.g., about 900 nm to 1600 nm). However, because the absorbing species 155 increase the refractive index of the glass, it is advantageous to further include refractive-index-lowering atoms 160 in the glass claddings 110, 112. The refractive-index-lowering atoms 160 can comprise atoms such as boron, fluorine or other species known to decrease the refractive index of glass.

Alternatively, the second optical segment can comprise absorbing species 155 that absorb at a selective narrow range of wavelengths can be used. An example of a wavelength selective absorbing species 155 is erbium-clusters. Erbium-clusters absorb a narrow wavelength of light centered at about 1550 nanometers. Erbium-clusters are formed when a glass fiber is doped with a high concentration of erbium ions. This results in erbium ions being closely associated with each other in the glass. The concentration of erbium used is too high to amplify light. Unlike single erbium ions, Erbium-clusters advantageously absorb light while re-emitting only minimal light at a longer wavelength. Hence they are ineffective for amplification but useful as absorbing species 155. Examples of wavelength selective absorbing rare earth elements are presented in, Erbium Doped Fiber Amplifiers: Principles and Applications, by Emmanuel Desurvire, John Wiley & Sons Inc. (1994) Chapter 4, FIG. 4.1, Page 210, incorporated by reference herein in its entirety. Examples of how to avoid (because they are contraindicated in amplifiers) the formation rare earth element clusters in glass are presented in U.S. Pat. No. 6,356,699, incorporated by reference herein in its entirety.

One skilled in the art would understand how to adjust the concentration of the absorbing species 155 and refractive index-lowering-atoms 160 in the inner or outer glass claddings 110, 112 to provide the desired degree of distributed absorption of the cladding light 125 while maintaining a suitable refractive index for the cladding. In some cases, the concentration of the absorbing species 155 is adjusted to provide multi-mode absorption of the cladding light 125 in the range of about 5 to about 50 dB per meter and more preferably, about 10 to about 25 dB per meter. In other cases, about 0.045 percent of the cladding light 125 is absorbed per one-millimeter length of the passive optical transmission fiber 105 having the absorbing species 155. In some embodiments, it is preferable for enough refractive index-loweringatoms 160 to lower the refractive index of the inner or outer glass claddings 110, 112 to same value it would have if the absorbing species 155 were not present.

As noted above, the absorbing species 155 can be in the inner or outer glass claddings 110, 112, or both. It is desirable for there to remain, however, the radial zone 115 substantially devoid of absorbing species 155 and of uniform refractive index. This helps prevent the absorbing species 155 from interacting with radial tails 120 (e.g., radial evanescent tails) of the signal 122 that extend into the inner cladding 110. In some cases, the radial thickness 117 of the radial zone 115 is at least about 5 microns, and more preferably, at least about 10 microns. In other cases, for easy of manufacturing, it is preferable for the absorbing species 155 to be located at an interface 170 between the inner and outer glass claddings 110, 112. In still other cases, the absorbing species 155 are located entirely in the outer glass cladding 112, but close enough (e.g., with about 5 microns) to the interface 170 to interact with the cladding light 125.

FIG. 1 depicts the second optical segment comprising absorbing species 155 for only a short length of the passive optical fiber 105. In other embodiments, however, the second optical segment comprising the absorbing species 155 traverses the entire length of the fiber 105. For example, in some preferred embodiments the second optical segment comprises absorbing species of erbium-clusters located in the inner cladding 110 and the second segment is present down the entire length of the passive optical transmission fiber 105.

As further illustrated in FIG. 1, the second optical segment can comprise one or more location 172 along the passive optical transmission fiber 105 comprising a gradually decreasing radial thickness 140 of outer cladding 112. Gradually decreasing the radial thickness 140 facilitates the distributed removal of the cladding light 125. The removal of cladding light 125 is facilitated by placing the index matching material 145 over the location 172 where the outer glass claddings is gradually removed. Similarly, the distributed removal of the cladding light 125 can be achieved by providing a second optical segment whose NA of the inner cladding 110 is configured to gradually decrease along the passive optical transmission fiber 105. As NA decreases, increasing quantities of cladding light 125 can exit the outer cladding 112, resulting in a distributed removal of the cladding light 125.

Yet another embodiment of the second optical segment structure a second optical fiber 175 directly coupled to the passive optical transmission fiber 105. Preferably, the second optical fiber 175 is used when multi-path interference (MPI) is not an issue. MPI occurs when there is coupling of cladding light 125 back into the core 107 where it interferes with the signal 122. MPI can result when fibers, especially unlike fibers, are coupled together. In such cases in is preferably to use one of the above-discussed power dissipation approaches. The second optical fiber 175 is positioned to receive and dissipate the cladding light 125 in the inner cladding 112 of the passive optical transmission fiber 105. Conventional procedures, well know to those skilled in the art, can be used to couple or splice the second optical fiber 175 to the passive optical transmission fiber 105.

As illustrated in FIG. 1, second optical fiber 175 can be an optical transmission fiber comprising a core 177 and single cladding 178 configured to receive cladding light 125 from the inner cladding 110 of the passive optical transmission fiber 105. In other cases, however, second optical fiber 175 can have substantially the same glass core, and inner and outer claddings as the passive optical transmission fiber 105. Any of the above-described second optical segment configurations to facilitate the removal the cladding light 125 can be incorporated into second optical fiber 175. For instance, all or a portion of second optical fiber 175 can comprise a bend, index match material, a grating, or absorbing species as discussed above.

In still other embodiments, the second optical segment comprises a coating 180. The coating 180 can surround all or a portion of one or both of the passive optical transmission fiber 105 or optional second optical fiber 175. The coating 180 is typically made of material selected for its ability to provide mechanical strength and to protect the passive optical transmission fiber 105 or optical segment 175. While some preferred coatings 180 comprises an organic polymer, other materials can be used. Examples include metal coatings, such as aluminum or gold coatings, or carbon-based coatings, such as graphite or diamond coatings.

In some cases, the coating 180 is also selected for its ability to absorb the cladding light 125 that exits the outer cladding 125 or the second optical fiber's 175 cladding 178. In such instances, the coating 180 preferably comprises a material having a refractive index that is equal to or greater than the refractive index of the outer cladding 125 or the second optical fiber's 175 cladding 178. In other cases, the coating 180 is selected for its ability to further guide the cladding light 125 to a location where its removal is more desirable. Examples of suitable organic polymer coatings 180 of this type are described in U.S. patent application No. 2004/0175086, which is commonly assigned and incorporated by reference in its entirety.

There are many situations, however, where an uncoated passive optical transmission fiber 105 is preferred, or even required. As an example, when the passive optical transmission fiber 105 is coupled to a ferrule 185, such as used in a connector, isolator or other free-space device, it is preferable for the passive optical transmission fiber 105 to be free of a polymer coating 180, at least for that portion 187 of the fiber 105 that contacts the ferrule 185. Leaving a soft polymer coating on the end portion 187 would make it difficult to form a rigid and precise fit of the end portion 187. An imprecise fit, in turn, can lead to misalignment of the passive optical transmission fiber 105 with resultant optical signal losses.

Another example of where a coating is undesirable is for certain high reliability applications, where the device package 130 is placed in a hermetically sealed housing 190 to keep out foreign matter and retain the atmosphere sealed inside the housing 190. In such instances, it is preferable for any portion 192 of the passive optical transmission fiber 105 that is located inside the hermetically sealed housing 190 to be uncoated. For example, when the device package 130 comprises a diode package, foreign matter, such as volatile compounds that out-gas from a polymer coating, can deposit in the diode package thereby causing device failure. Polymer coatings should be excluded from such situations because all polymers will out-gas to some extent.

Figure 4:
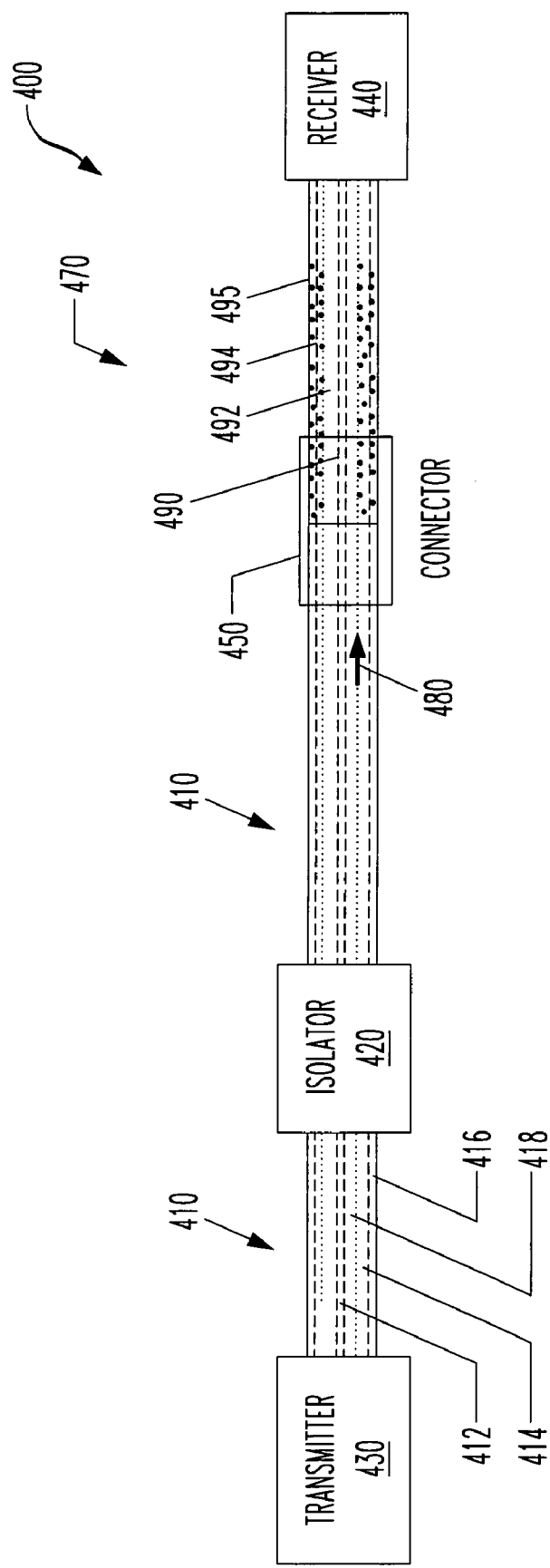
FIG. 4 schematically illustrates an exemplary system.

FIG. 4 schematically illustrates an exemplary system 400 constructed according to the principles of the present invention. The system 400 comprises a passive optical transmission fiber 410. The passive optical transmission fiber 410 comprises a passive glass fiber core 412, a silica-glass optical inner cladding 414 surrounding the core 412, and a silica-glass based optical outer cladding 416 surrounding the inner cladding 414. The passive optical fiber 410 also comprises a second optical segment configured to dissipate light in the inner cladding 414.

Any of the embodiments of the passive optical transmission fibers shown in FIGS. 1–3 and discussed above can be used in the system 400. For example, the second optical segment can comprise any of the above described configurations such as bends, reduced outer cladding 416 radial thickness, gratings, absorbing atoms, second fiber etc . . . , to dissipate light. Preferably the optical inner cladding 414 comprises a radial zone 418 adjacent to and surrounding the core 412 and having the attributes as described above.

A variety of devices of the system 400 can be connected to the passive optical transmission fiber 410. In some instances, the passive optical transmission fiber 410 brings light into or out of a lumped optical device 420 such as an optical isolator. In other instances, the passive optical transmission fiber 410 brings light out of a transmitter 430, such as a laser, or sends light to a receiver 440.

Alternatively, the passive optical transmission fiber 410 can be connected to a coupling device such as a connecter or coupler. Those skilled in the art would be familiar with variety of configurations that these, and similar coupling devices have. For instance, as illustrated in FIG. 4, the connecter 450 is a splice that uses conventional fusion or mechanical means to join the passive optical transmission fiber 410 to another optical transmission fiber 470. The connector 450 can be any conventional mechanical or optical device that provides a demountable connection between the passive optical transmission fiber 410 and one or more other optical fibers, or to other system components. In the embodiment shown in FIG. 4, the connector 450 directly couples the optical transmission fiber 410 to the second optical fiber 470.

In some preferred embodiments, the second optical segment comprises a second optical fiber 470 configured to dissipate light 480 in the inner cladding 414. More preferably, the second optical fiber 470 incorporates a number of the above-discussed second optical segments for removing the cladding light 480. For example, the second optical fiber 470 shown in FIG. 4 comprises a second core 490, and inner and outer silica-glass cladding 492, 494. The second inner silica-glass cladding 492 is positioned to receive the cladding light 480 propagating in the inner silica glass cladding 414. The second outer silica-glass cladding 494 is configured to dissipate the cladding light 480. To facilitate a distributed removal of the cladding light 480, at least one of the second inner or outer silica-glass claddings 492, 494 can comprise absorbing species 495 configured to absorb transmission wavelengths of the light 480.

Although the present invention has been described in detail, those of ordinary skill in the art should understand that they can make various changes, substitutions and alterations herein without departing from the scope of the invention.

What is claimed is:

1. An apparatus, comprising:
    a passive optical transmission fiber, comprising:
        a passive glass fiber core, wherein said core is substantially free of any species that would change a frequency spectrum of core mode signals or that would the cause a signal loss of greater than about 0.5 dB per meter length of said core;
        a glass optical inner cladding surrounding said core;
        a glass optical outer cladding surrounding said inner cladding; and
        an optical segment configured to dissipate light in said inner cladding, wherein said inner cladding has a lower index of refraction than said passive glass fiber core and said outer cladding has a lower index of refraction than said inner cladding.

2. The apparatus of claim 1, wherein said inner cladding has a radial zone adjacent to and surrounding said core, said radial zone having a refractive index that varies by less than 0.001 and a radial thickness of at least about 5 microns.

3. The apparatus of claim 1, wherein said inner cladding has a numerical aperture ranging from about 0.05 to about 0.25.

4. The apparatus of claim 1, wherein a diameter of said inner cladding is at least about five times greater than a diameter of said passive glass fiber core.

5. The apparatus of claim 1, wherein said passive optical transmission fiber is uncoated.

6. The apparatus of claim 1, wherein an uncoated portion of said passive optical transmission fiber comprises an end that is located in a ferrule.

7. The apparatus of claim 1, wherein said optical segment comprises a bend in said passive optical transmission fiber.

8. The apparatus of claim 2, wherein said radial zone is substantially devoid of absorbing species configured to absorb transmission wavelengths of a light in said inner cladding.

9. An apparatus, comprising:
a passive optical transmission fiber, comprising:
   a passive glass fiber core;
   a glass optical inner cladding surrounding said core;
   a glass optical outer cladding surrounding said inner cladding; and
   an optical segment configured to dissipate light in said inner cladding, wherein said inner cladding has a lower index of refraction than said passive glass fiber core and said outer cladding has a lower index of refraction than said inner cladding and said optical segment comprises an uncoated portion of said passive optical transmission fiber covered with an index-matching material, said index-matching material selected from the group consisting of: adhesives; gels; glass; and organic polymer coatings, wherein a refractive index of said index-matching material is within about 1 percent of a refractive index of said outer cladding.

10. An apparatus, comprising:
a passive optical transmission fiber, comprising:
   a passive glass fiber core;
   a glass optical inner cladding surrounding said core;
   a glass optical outer cladding surrounding said inner cladding; and
   an optical segment configured to dissipate light in said inner cladding, wherein said optical segment comprises absorbing species configured to absorb transmission wavelengths of a light in said inner cladding, said absorbing species being located in one or both of said inner cladding or said outer cladding and said absorbing species are erbium-clusters.

11. An apparatus, comprising:
a passive optical transmission fiber, comprising:
   a passive glass fiber core;
   a glass optical inner cladding surrounding said core;
   a glass optical outer cladding surrounding said inner cladding; and
   an optical segment configured to dissipate light in said inner cladding, wherein said optical segment comprises absorbing species configured to absorb transmission wavelengths of a light in said inner cladding, said absorbing species being located in one or both of said inner cladding or said outer cladding and said optical segment comprises absorbing species of erbium-clusters located in said inner cladding and said optical segment traverses an entire length of said passive optical transmission fiber.

12. An apparatus, comprising:
a passive optical transmission fiber, comprising:
   a passive glass fiber core;
   a glass optical inner cladding surrounding said core;
   a glass optical outer cladding surrounding said inner cladding; and
   an optical segment configured to dissipate light in said inner cladding, wherein said optical segment comprises an organic polymer coating surrounding said outer cladding, said organic polymer coating having a higher index of refraction than said outer cladding.

13. An apparatus, comprising:
a passive optical transmission fiber, comprising:
   a passive glass fiber core;
   a glass optical inner cladding surrounding said core;
   a glass optical outer cladding surrounding said inner cladding; and
   an optical segment configured to dissipate light in said inner cladding, wherein said optical segment comprises an organic polymer coating surrounding said outer cladding, said organic polymer coating having an index of refraction that is lower than said outer cladding.

14. An apparatus, comprising:
a passive optical transmission fiber, comprising:
   a passive glass fiber core;
   a glass optical inner cladding surrounding said core;
   a glass optical outer cladding surrounding said inner cladding; and
   an optical segment configured to dissipate light in said inner cladding, wherein said optical segment is a second optical fiber directly coupled to said passive optical transmission fiber.

15. The apparatus of claim 14, wherein said second optical fiber comprises a second cladding surrounding a second passive glass fiber core, said second cladding positioned to receive said light propagating in said inner cladding, said second cladding configured to dissipate said light.

16. The apparatus of claim 15, wherein said second cladding comprises a second inner and a second outer silica-glass cladding, wherein one or both of said second inner or outer silica-glass claddings comprise absorbing species configured to absorb wavelengths of said light.

17. A system, comprising:
a device; and
a passive optical transmission fiber connected to said device, wherein said passive optical transmission fiber comprises:
   a passive glass fiber core, wherein said core is substantially free of any species that would change a frequency spectrum of core mode signals or that would the cause a signal loss of greater than about 0.5 dB per meter length of said core;
   a silica-glass optical inner cladding surrounding said core;
   a silica-glass optical outer cladding surrounding said inner cladding; and
   an optical segment configured to dissipate light in said inner cladding, wherein said inner cladding has a lower index of refraction than said passive glass fiber core and said outer cladding has a lower index of refraction than said inner cladding.

18. The system of claim 17, wherein said inner cladding has a radial zone adjacent to and surrounding the core, said radial zone having a refractive index that varies by less than 0.001 and a radial thickness of at least about 5 microns.

19. The system of claim 17, wherein said device is a lumped optical device wherein said passive optical transmission fiber brings light into or out of said device.

* * * * *